United States Patent [19]

Louzon et al.

[11] 3,831,265

[45] Aug. 27, 1974

[54] METHOD OF PACKAGING AN ELECTRICAL DEVICE

[75] Inventors: Theodore J. Louzon, Bolingbrook, Ill.; William McMahon, Summit, N.J.; John J. Mellon, Westchester, Ill.

[73] Assignees: Bell Telephone Laboratories, Incorporated, Murray Hill, N.J. ; by said McMahon; Western Electric Company, Incorporated, New York, N.Y. ; by said Louzon and Mellon

[22] Filed: Jan. 23, 1973

[21] Appl. No.: 325,987

[52] U.S. Cl. ........................ 29/592, 29/627, 117/49, 148/6.27, 174/52 PE, 264/135, 264/272, 317/234 E

[51] Int. Cl. ........................ H01g 1/02, H01g 13/00

[58] Field of Search ............ 29/624, 592, 627, 602, 29/613, 25.42; 174/50.5, .51, .52, .54, .56, .58, .6, .61, .62, 52 R, 52 S, 52 PE, 59, 60, 65; 338/226, 243, 244, 250, 256, 257; 317/234 E, 230; 264/134, 135, 255, 262, 272; 117/213, 218, 5.3, 49, 62, 62.2, 70 R, 70 C, 72, 75, 77; 148/6.27

[56] References Cited

UNITED STATES PATENTS

| | | | |
|---|---|---|---|
| 2,360,264 | 10/1944 | Osterheld | 338/244 |
| 2,360,267 | 10/1944 | Osterheld | 338/244 |
| 3,187,226 | 6/1965 | Kates | 29/626 UX |
| 3,271,638 | 9/1966 | Murad | 174/52 PE |
| 3,364,567 | 1/1968 | Brown et al. | 29/627 |

*Primary Examiner*—Charles W. Lanham
*Assistant Examiner*—Joseph A. Walkowski
*Attorney, Agent, or Firm*—D. D. Bosben

[57] ABSTRACT

An electrical device having a pair of projecting leads, such as a capacitor, is packaged in an aluminum container by first chemically etching the inner and outer surfaces of the container and then chemically oxidizing the surfaces with an ammonium hydroxide solution to form a film layer of various aluminum compounds thereon. The container then is heat treated to break down and convert a substantial portion of the formed aluminum compounds to aluminum oxide ($Al_2O_3$), and to further oxidize the surfaces of the container, with the ammonia being driven off in the form of a gas so as to leave no contaminating residue, thus producing a dielectric film layer comprised primarily of aluminum oxide ($Al_2O_3$) and having a substantially increased d.c. voltage breakdown strength in comparison to the d.c. voltage breakdown strength of the initially formed layer. The electrical device then is placed in the container with its leads projecting therefrom, and a dielectric potting material is introduced into the container to form a substantially fluid-impervious bond with the inner aluminum oxide surfaces. In the alternative, the container may be subjected to additional oxidizing by an ammonium hydroxide solution and heat-dried, to further increase the d.c. voltage breakdown strength of the dielectric film layer, prior to encapsulating the electrical device in the container.

7 Claims, 5 Drawing Figures

METHOD OF PACKAGING AN ELECTRICAL DEVICE

BACKGROUND OF THE INVENTION

1. Field of the Invention

This invention relates to a method of packaging an electrical device, and more particularly to a method of fabricating a packaged electrical capacitor having relatively high moisture resistance and capacitance stability.

2. Description of the Prior Art

In the manufacture of polystyrene capacitors made of alternately wound layers of electrode material and dielectric material, it is standard practice to package each capacitor by wrapping it in plastic tape and then filling its ends with a suitable epoxy resin. Capacitors manufactured in this manner, however, tend to display an excessive capacitance shift upon being subjected to high moisture conditions, and therefore are not suitable in certain applications. Further, while the moisture-proof capability of capacitors packaged in this way can be improved significantly by hermetically sealing them in a suitable manner, this is undesirable because of the expense involved.

One solution to the problem of producing capacitors having high moisture resistance involves potting a capacitor or a capacitor assembly in an aluminum container lined with an insulating layer of cured epoxy resin, as is disclosed in the U.S. Pat. No. 3,364,567, issued Jan. 23, 1968 to D. R. Brown et al. The insulating liner insures electrical isolation of the capacitor from the aluminum container and provides an adherent surface for the potting material. In this arrangement, the aluminum container initially is heated to approximately 400°F and epoxy in powdered form is placed in the heated container. The excess powder then is shaken from the container leaving a powdered coating of the epoxy on the inside thereof, and the container is subjected to heat at a sufficient temperature and for a sufficient time period to set and cure the epoxy coating. The capacitor then is placed in the lined aluminum container, the container is filled with an epoxy resin potting material, and the potting material is cured to form a relatively hard layer of substantial thickness over the capacitor body. During the curing of the potting material it fuses with the epoxy resin liner and bonds to the projecting leads of the capacitor, whereby the lined aluminum container and the potting material (as a result of its substantial thickness) produce a protective moisture-proof enclosure for the capacitor. A capacitor encapsulated in this manner has good moisture resistance and capacitance stability under high moisture conditions, although the process is relatively expensive and time consuming because of the steps involved in forming the epoxy liner in the container.

SUMMARY OF THE INVENTION

In accordance with this invention, an electrical device having a pair of projecting leads is packaged in an aluminum container by initially exposing at least the inner surfaces of the container to an etchant solution to clean and roughen the surfaces, and to remove existing parasitic oxides therefrom. At least the inner surfaces of the container then are exposed to an ammonium hydroxide solution to neutralize the etchant solution and to form an initial film layer of aluminum compounds on the surfaces. Next, the container is heat treated to break down and convert a substantial portion of the aluminum compounds to aluminum oxide and to further oxidize the inner surfaces of the container, to produce a dielectric film layer comprised primarily of aluminum oxide and having a d.c. voltage breakdown strength substantially greater than that of the initially formed film layer. The electrical device then may be placed in the aluminum container with the leads of the device projecting therefrom and a substantially fluid-impervious dielectric potting material is introduced into the container to form a substantially fluid-impervious bond with the aluminum oxide layer.

In a specific embodiment of the invention, the aluminum container is immersed in an etchant solution and subsequently in an ammonium hydroxide solution, so as to form a film layer of aluminum compounds on both the inner and outer surfaces of the container. After being heat treated, the container is again immersed in the ammonium hydroxide solution and subsequently heat-dried, to further increase the d.c. voltage breakdown strength of the dielectric film layer on the surfaces of the container.

DETAILED DESCRIPTION

Figure 4:
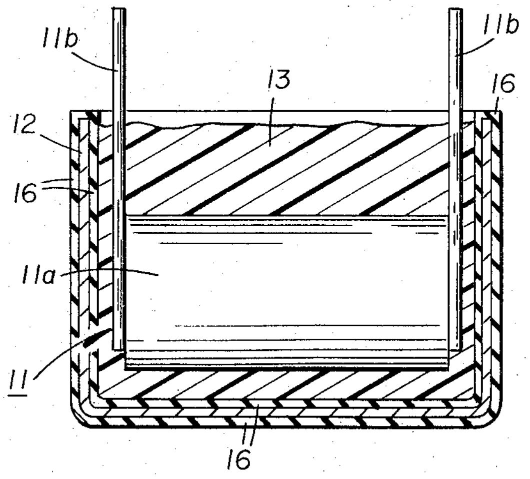
FIG. 4 is a cross-section view similar to FIG. 3 and illustrating an electrical device packaged in accordance with the invention.

FIG. 4 illustrates, by way of example, an electrical device, such as a capacitor 11, which has been packaged in an aluminum container 12 in a substantially fluid-impervious dielectric potting material 13, in accordance with the disclosed embodiment of the invention. The capacitor 11 includes a capacitor body **11*a* of the type which is wound from alternate layers of electrode material, such as a tin-lead alloy foil, and a dielectric material, such as a biaxially oriented polystyrene film, and which then is subjected to a suitable heat treatment to stabilize its capacitance value. The ends of the capacitor body 11a then are chamfered and spin-swaged to compact the foil extending therefrom, and leads 11b** are attached to the ends of the capacitor body by soldering in a suitable manner. Other electrical devices, such as other types of capacitors, capacitor assemblies, resistors, inductors, semiconductors, etc., also are adapted to be packaged by the method of this invention.

Figure 1:
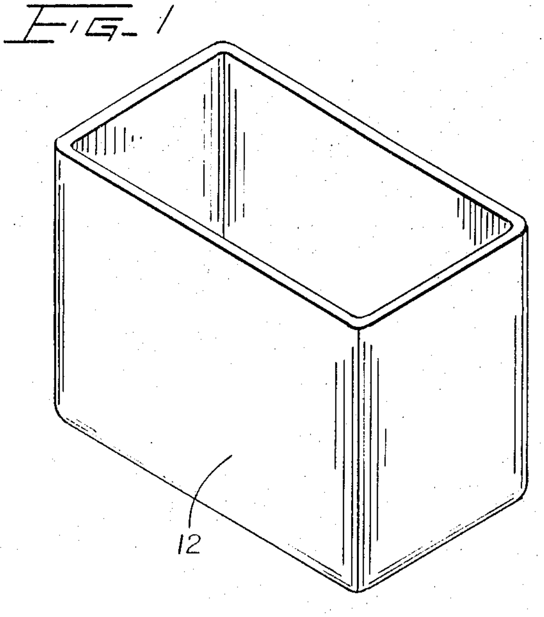
FIG. 1 is an isometric view of an aluminum container which may be utilized in practicing the invention.
Figure 2:
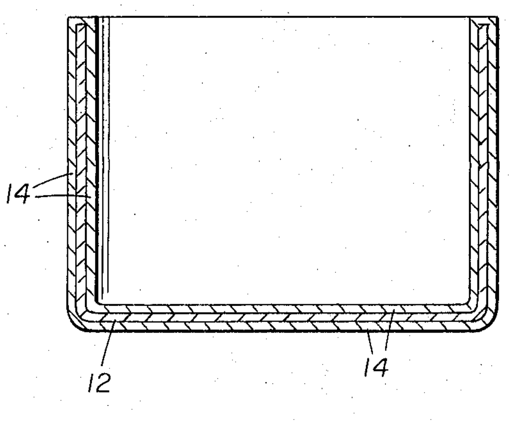
FIG. 2 is a cross-sectional view of the aluminum container in FIG. 1 after the container has been subjected to a chemical oxidizing step in accordance with the invention.
Figure 3:
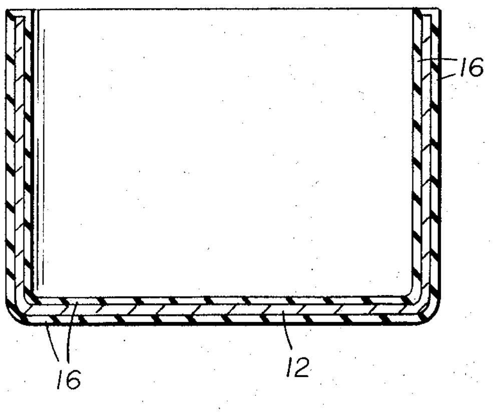
FIG. 3 is a cross-sectional view of the aluminum container in FIG. 2 after the container has been subjected to a heat-oxidizing step in accordance with the invention.
Figure 5:
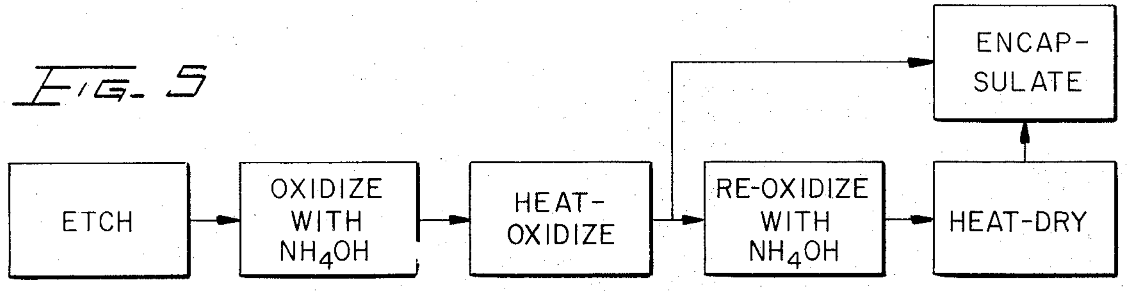
FIG. 5 is a block diagram illustrating certain specific fabricating steps in accordance with the invention.

In general, referring to FIG. 5, in packaging the capacitor 11 in the aluminum container 12, the container as shown in FIG. 1 initially is chemically etched, and then is chemically oxidized by being exposed to an ammonium hydroxide solution to produce a film layer 14 of aluminum compounds on the inner and outer wall surfaces of the container, as shown in FIG. 2, wherein the thickness of the film layer relative to that of the container is exaggerated for the purpose of illustration. Next, the aluminum container 12 is heat-treated to break down and convert a substantial portion of the aluminum compounds to aluminum oxide ($Al_2O_3$), and to further oxidize the container surfaces, to produce a dielectric film layer 16 comprised primarily of aluminum oxide ($Al_2O_3$), as shown in FIG. 3, wherein the thickness of the film layer again is exaggerated for the purpose of illustration.

If the dielectric strength of the aluminum oxide film layer 16 (on the inner and outer container surfaces combined) is then sufficient to meet requirements, the capacitor 11 is encapsulated in the container 12 in the potting material 13, as shown in FIG. 4, with the potting material forming a substantially fluid-impervious bond or junction with the oxide film layer. If a greater dielectric strength of the oxide film layer 16 is required, however, the container 12 is again oxidized by being exposed to the ammonium hydroxide solution and then heat-dried, to increase the dielectric strength of the oxide film layer. The potting material 13 may be of any suitable type, such as a bisphenol-A type epoxy resin available under the tradename "Epi-Rez" (Number 5071), from the Celanese Plastics Division, Celanese Corporation, Louisville, Kentucky, mixed with a suitable hardener. Preferably, the chemical etching, chemical oxidation and heat oxidation steps are carried out in batch-type operations with a plurality of the containers 12 being processed simultaneously.

The etchant solution used in the etching operation may be of any suitable type which is capable of cleaning the surfaces of the aluminum containers 12 and removing existing parasitic aluminum oxides and other low dielectric strength contaminants therefrom, which will subsequently be neutralized in the chemical oxidation cycle, and which will not leave any contaminating residue which will affect the dielectric quality of the subsequently formed oxide film layer 16. The etchant solution also should be capable of attacking the grain boundaries of the aluminum to produce a roughening of the walls of each container 12 and the formation of minute interstices therein, to promote strong adhesion of the subsequently formed oxide film layer 16 to the walls and strong moisture resistive adhesion of the potting material 13 to the oxide film layer, so as to form a finished package of rigid integral construction. For example, an etching solution containing hydrofluoric acid may be used, such as that known as Keller's reagent, consisting of 95 percent water, 1.0 percent hydrofluoric acid, 1.5 percent hydrochloric acid and 2.5 percent nitric acid, by volume, with the containers 12 being immersed in the reagent for 20 minutes at room temperature. The containers 12 then are subjected to a cold water rinse, followed by a hot water rinse. A flouride powder available under the tradename "ARP-28" from Allied Research Products Inc., Division of the Richardson Company, Melrose Park, Illinois, and mixed with concentrated nitric acid at the rate of 2 pounds per gallon, also may be used. With this latter etchant solution, the aluminum containers 12 are dipped in the solution for 10 seconds at room temperature, subjected to an intermediate water rinsing operation, redipped in the solution for an additional 10 seconds, and then subjected to a final water rinse.

In the chemical oxidation of the containers 12, after the containers have been etched and water rinsed, and with the containers still wet, they are immersed in an ammonium hydroxide solution which reacts with the aluminum to cause the formation of various aluminum compounds, primarily in the form of hydrated aluminum oxides and aluminum hydroxides, on the surfaces of the containers. The concentration of the ammonium hydroxide solution, the temperature of the solution and the immersion time in the solution may be varied, depending on the degree of dielectric strength required in the final oxide film layer 16. For example, a combined dielectric strength of the oxide film layer 16 on both the inner and outer surfaces of the containers 12 in excess of 400 volts d.c. has been achieved utilizing a solution containing on the order of two parts water to one part ammonium hydroxide, by volume, a temperature of the solution on the order of 180°F, and an immersion time of 1-½ hours, for the first chemical oxidation. The containers 12 then were heat treated at a temperature on the order of 700°F for at least 1-½ hours and subjected to a second chemical oxidation by immersion in an ammonium hydroxide solution of the same concentration and temperature for 45 minutes. Prior to encapsulation, the containers 12 were heat-dried in a steam-heated centrifugal dryer for 15 minutes.

Ammonium hydroxide is utilized as the chemical oxidizing agent since it will not leave a contaminating electrically conductive residue on the containers 12 after the heat-oxidation cycle, which will affect the insulating qualities and the dielectric strength of the oxide film layer 16, or interfere with the adhesion of the potting material 13 to the oxide film layer. Instead, the ammonia, being volatile, is driven off as a gas during the heat treatment operation, leaving the oxide film layer 16 in an uncontaminated form having excellent dielectric and mechanical strength properties.

In contrast, an oxidizing agent such as sodium or potassium hydroxide can leave a metallic ion residue on the oxide film layer 16, which residue, being electrically conductive, could have a detrimental effect on the insulating qualities and the dielectric strength of the dielectric film layer 16. This would be particularly undesirable in the case of electrical devices such as the packaged capacitor 11 which normally is used on a printed circuit board in a congested environment in which the aluminum container 12 can inadvertently come into contact with adjacent circuit paths or another electric device. Through a bi-metal reaction, the metallic ion residue also could cause corrosion and degradation of the electrodes of the capacitor 11 which may be touching or nearly touching the container 12, or corrosion and degradation of the circuit paths with which the container becomes engaged. Thus, while it would be necessary that this metallic ion residue be removed by additional processing prior to encapsulation of the capacitor 11, by using ammonium hydroxide as the oxidizing agent this additional processing can be eliminated.

As an example of the manner in which the chemical oxidation cycle time can be varied depending upon the dielectric strength desired in the oxide film layer 16, several batches of the containers 12 were immersed in a solution having a water to ammonium hydroxide ratio on the order of 3:1 for variable time periods at a temperature on the order of 180°F, after having been etched with Keller's reagent as above described. The containers 12 then were heat-treated at a temperature on the order of 800°F for one hour, heat-dried in an air oven at a temperature on the order of 248°F for 1 hour, and their voltage breakdown strengths measured through their bottom walls. The results, which indicate a progressive increase in dielectric strength of the oxide film layer 16 from an immersion time of 15 minutes up through an immersion time on the order of 1-½ hours, but no significant increase over an extended period, are shown in the following Table I:

TABLE I

| $NH_4OH$ Immersion Time | Average D.C. Breakdown Voltage |
|---|---|
| 5 minutes | 0 |
| 15 minutes | 140 |
| 30 minutes | 250 |
| 60 minutes | 300 |
| 90 minutes | 320 |
| 16 hours | 360 |

To illustrate the manner in which the other process variables can be changed, 150 of the aluminum containers 12 were chemically etched with the "ARP-28" and nitric acid solution in the manner as above described. Thirty of the containers 12 then were immersed in each of five different respective concentrations of water to ammonium hydroxide for 2-½ hours with the temperature of the solutions being maintained in a range on the order of 160°–200°F. Fifteen of the aluminum containers 12 from each solution then were annealed at 500°F for 2 hours, and 15 of the containers from each solution were annealed at 700°F for 1-½ hours. Each of five of these containers 12 then was tested for d.c. voltage breakdown strength through its bottom wall, and thus through the film layer on both the inner and outer surfaces thereof.

The ten remaining aluminum containers 12 for each solution and annealing temperature were again chemically oxidized in a 3:1 water to ammonium hydroxide solution at 190°F for 45 minutes. Five of these containers 12 then were heat dried in an air oven for one hour at 248°F, and their d.c. voltage breakdown strengths were measured as above.

Similarly, the five remaining containers 12 for each solution concentration and annealing temperature were chemically oxidized a third time in a 3:1 water to ammonium hydroxide solution at 180°F for 30 minutes. These containers 12 then were heat dried in an air oven at 248°F for one hour, after which their d.c. voltage breakdown strengths were measured.

Average breakdown voltages for the different sample lots of the containers 12 as a result of the above-described processing operations, are shown in the following Table II:

TABLE II

| Average D.C. Breakdown Voltages | | | | |
|---|---|---|---|---|
| 500°F Heat | | Test No. 1 | Test No. 2 | Test No. 3 |
| 1 to 1 | Conc. | 268 | 488 | 384 |
| 2 to 1 | do. | 360 | 430 | 412 |
| 3 to 1 | do. | 400 | 475 | 350 |
| 4 to 1 | do. | 374 | 396 | 428 |
| 5 to 1 | do. | 398 | 406 | 364 |
| 700°F Heat | | | | |
| 1 to 1 | Conc. | 404 | 472 | 424 |
| 2 to 1 | do. | 334 | 600 | 486 |

TABLE II-Continued

| Average D.C. Breakdown Voltages | | | | |
|---|---|---|---|---|
| 500°F Heat | | Test No. 1 | Test No. 2 | Test No. 3 |
| 3 to 1 | do. | 346 | 518 | 480 |
| 4 to 1 | do. | 350 | 510 | 458 |
| 5 to 1 | do. | 316 | 492 | 458 |

From Table II it is seen that the highest average d.c. voltage breakdown value (600 volts d.c.) for the dielectric film layer 16 was obtained on the containers 12 which were oxidized for approximately 2-½ hours with a 2:1 water-to-ammonium hydroxide solution, heat-treated at 700°F for 1-½ hours, and then chemically re-oxidized a second time. However, relatively high dielectric strengths (above 500 volts d.c.) also were obtained with 3:1 and 4:1 water-to-ammonium hydroxide solutions in the same type process. Further, it is seen that the average dielectric strengths following the first chemical oxidation and heat treatment were on the order of 270–400 volts d.c., whereas the average dielectric strengths following the second chemical oxidation substantially increased to values on the order of 400–600 volts d.c., while a third chemical oxidation generally produced a decrease, rather than an increase in dielectric strength.

Packaged capacitors 11 utilizing the aluminum containers 12 heat treated at the higher temperature of 700°F also demonstrate slightly better resistance to moisture penetration and somewhat better capacitance stability under high moisture conditions than units utilizing containers heat treated at 500°F. This is attributed, at least in part, to the fact that at the higher temperature more of the aluminum compounds of the initial film layer 14 are converted to aluminum oxide ($Al_2O_3$), the "baking" effect at the higher temperature tends to make the oxide film layer 16 more impervious, and the containers 12 become annealed to some degree, making them more flexible in nature. Thus, in this latter respect, when one of the packaged capacitors 11 subsequently is subjected to varying heat conditions, while the capacitor and the potting material 13 both have different coefficients of thermal expansion in comparison to aluminum, the aluminum container 12 can expand and contract with the capacitor and the potting material as a unit, whereby the tendency for the potting material 13 to fracture or separate from the oxide film layer 16 under varying heat conditions is reduced and the substantially moistureproof capability of the package is maintained.

From the standpoint of the maximum heat treat temperature which may be utilized, if the temperature becomes too high, approaching the melt temperature of the aluminum (about 1,200°F), as for example 900°F, the containers 12 become soft and difficult to handle without causing deformation thereof. Accordingly, for best results, the heat treat temperature of the containers 12 following the first chemical oxidation preferably is not substantially in excess of 800°F.

Summarizing, it is seen that a packaged electrical device, such as the capacitor 11, which is resistant to moisture and thus unaffected by moisture under operating conditions, and a relatively inexpensive method of fabricating it, have been disclosed in which the dielectric oxide film layer 16 is formed on both the inner and outer surfaces of the container 12 to provide an effective electrically insulating barrier of relatively high dielectric strength for the capacitor. The oxide film layer 16 also is formed so that it adheres strongly to the walls of the container 12, and so that it is rough in texture with microscopic interstices therein, whereby the potting material 13 can adhere or bond strongly and integrally thereto, to provide a package of strong integral construction. In addition, since the strong adherent, dielectric oxide film layer 16 also covers the outside surfaces of the aluminum container 12, the danger of the container shorting out adjacent circuit paths or other electrical devices in congested circuit environments is substantially eliminated.

We claim:

1. The method of packaging an electrical device having a pair of projecting leads in an aluminum container having an open end, which comprises:

exposing at least the inner surfaces of the aluminum container to an etchant solution to clean and roughen the surfaces and remove existing parasitic contaminants therefrom;

exposing at least the inner surfaces of the aluminum container to an ammonium hydroxide solution to neutralize the etchant solution and form an initial film layer of aluminum compounds on the inner surfaces;

heating the aluminum container to break down and convert a substantial portion of the formed aluminum compounds to aluminum oxide, with the ammonia being driven off as a gas without leaving any contaminating electrically conducting residue, and so as to further oxidize the aluminum, thereby producing a roughened dielectric film layer comprised primarily of aluminum oxide and having a substantially increased d.c. voltage breakdown strength in comparison to the d.c. voltage breakdown strength of the initial film layer;

placing a portion of the electrical device in the aluminum container with the leads of the electrical device projecting from the open end of the container; and introducing a substantially fluid-impervious dielectric potting material into the aluminum container to encapsulate the portion of the electrical device which is in the container and to form a substantially fluid-impervious bond with the dielectric oxide film layer, to produce a moisture-resistant package of rigid integral construction.

2. The method of packaging an electrical device as recited in claim 1, which further comprises:

exposing the outer surfaces of the aluminum container to an etchant solution to clean and roughen the surfaces and remove existing parasitic contaminants therefrom; and exposing the outer surfaces of the aluminum container to an ammonium hydroxide solution to neutralize the etchant solution and to form an initial film layer of aluminum compounds on the outer surfaces, with a substantial portion of the aluminum compounds in the initial film layer being converted to aluminum oxide and additional aluminum oxide being formed on the outer surfaces upon the subsequent heating of the container.

3. The method of packaging an electrical device as recited in claim 1, in which:

the aluminum container is heated to a temperature in a range on the order of 500°–800°F.

4. The method of packaging an electrical device as recited in claim 1, in which:

the aluminum container is heated to a temperature on the order of 700°F.

5. The method of packaging an electrical device as recited in claim 1, in which:

at least the inner surfaces of the aluminum container are exposed to an ammonium hydroxide solution which contains water in a range on the order of two to four times that of the ammonium hydroxide, at a temperature in a range on the order of 160°–200°F., and for a time period in a range on the order of 15 minutes to 2 hours.

6. The method of packaging an electrical device as recited in claim 1, in which:

at least the inner surfaces of the aluminum container are again exposed to an ammonium hydroxide solution and then heat-dried prior to encapsulating the electrical device therein, to further oxidize the inner surfaces and increase the dielectric breakdown strength of the oxide film layer on the surfaces.

7. The method of packaging an electrical device as recited in claim 6, in which:

at least the inner surfaces of the aluminum container are again exposed to an ammonium hydroxide solution which contains water in a range on the order of two to three times that of the ammonium hydroxide, at a temperature on the order of 180°F., for a time period not substantially less than 45 minutes.

* * * * *